United States Patent [19]

Barnstijn et al.

[11] Patent Number: 5,715,387
[45] Date of Patent: Feb. 3, 1998

[54] METHOD AND SYSTEM FOR LOADING AND CONFIRMING CORRECT OPERATION OF AN APPLICATION PROGRAM IN A TARGET SYSTEM

[75] Inventors: Michael A. Barnstijn; Mark E. Church; Barry W. Linkert, all of Kitchener; Mihal Lazaridis, Waterloo, all of Canada

[73] Assignee: Research In Motion Limited, Waterloo, Canada

[21] Appl. No.: 742,632

[22] Filed: Nov. 1, 1996

Related U.S. Application Data

[63] Continuation of Ser. No. 386,528, Feb. 10, 1995, Pat. No. 5,600,790.

[51] Int. Cl.[6] .................................................. G06F 9/455
[52] U.S. Cl. .................... 395/183.14; 395/183.18; 395/704
[58] Field of Search ........................... 395/183.14, 705, 395/183.18, 704, 427, 497.02

[56] References Cited

U.S. PATENT DOCUMENTS

| | | | |
|---|---|---|---|
| 3,815,103 | 6/1974 | Holtey et al. | 395/183.18 |
| 4,277,827 | 7/1981 | Carlson et al. | 395/500 |
| 4,729,096 | 3/1988 | Larson | 395/705 |
| 4,730,315 | 3/1988 | Saito et al. | 395/183.14 |
| 5,046,033 | 9/1991 | Andreasen et al. | 364/580 |
| 5,228,039 | 7/1993 | Knoke et al. | 395/183.04 |
| 5,255,385 | 10/1993 | Kikuchi | 395/183.01 |
| 5,287,512 | 2/1994 | Ellis | 395/471 |
| 5,293,629 | 3/1994 | Conley et al. | 395/708 |
| 5,363,501 | 11/1994 | Pullela | 395/500 |
| 5,371,894 | 12/1994 | Dibrino | 395/183.11 X |
| 5,581,695 | 12/1996 | Knoke et al. | 395/183.04 |

*Primary Examiner*—Ly Hua
*Attorney, Agent, or Firm*—Jones, Day, Reavis & Pogue; Charles B. Meyer

[57] ABSTRACT

A method and system provides a special purpose or embedded system developer with the ability to confirm the correct operation of a computer program designed to operate on a target system whose processing and storage capabilities may be more austere than the host system upon which the computer program is designed and tested. A key feature of the method and the system enables a developer to execute and debug an application program on a host system while observing and testing the operation of the program through the input/output of the target system. Another feature of the method and system is an application loader that dynamically sizes and, as necessary, reconfigures the available memory to permit multiple applications to reside simultaneously on the target system by resolving addresses in the target system at the time an application of interest is downloaded to the target system.

5 Claims, 9 Drawing Sheets

METHOD AND SYSTEM FOR LOADING AND CONFIRMING CORRECT OPERATION OF AN APPLICATION PROGRAM IN A TARGET SYSTEM

This is a continuation of application Ser. No. 08/386,528 filed Feb. 10, 1995, now U.S. Pat. No. 5,600,790.

FIELD OF THE INVENTION

The present invention is a system and method for verifying the correct operation of computer application programs. The invention is associated generally with the fields of application debugging or program debugging, but is particularly relevant to the development, optimization and debugging of special purpose or embedded microprocessor systems.

BACKGROUND OF THE INVENTION

The present invention relates to a method and system for confirming the correct operation of a computer program that is to be executed on a computer system (the "target system" or "remote system") that is different than the computer system on which the application code is being developed (the "host system" or "development system").

Several well-known methods for developing and verifying the correct operation of target system programs currently exist. One popular method is to create a software simulation of the target system to simulate the input/output (I/O) process through use of computer graphics, printed output, or other means. This method has two primary disadvantages: 1) the simulation of the target system may have inherent errors or inaccuracies and thus may not properly indicate the behavior of the target system and 2) the simulation program requires significant programming effort to generate and validate. Additionally, such simulation programs are generally cumbersome, are frequently application-dependent and usually require a significant amount of storage.

Another popular method of developing target system applications is though use of a processor or Central Processing Unit Emulator ("CPU Emulator"). This method requires that the CPU for the target system be replaced during the development phase with a device that emulates the functions of the CPU. Although such a system may provide an application program developer with the ability to examine the internal status of the CPU and to control extensively the operations of the CPU, such emulation systems are physically large, expensive and often require special or application-specific hardware and software. Frequently, special adapters and wiring harnesses are also required to attach the emulators to the target systems.

A further well-known method of debugging target system applications is by the use of software debuggers such as Microsoft's CodeView® and Borland's Turbo Debugger® in the IBM PC® compatible development environments. When the application is being designed to run on an IBM PC, these debugging programs enable the developer to control the execution of the program and provide information to the developer about internal program states. This debugging method requires that the target system be IBM PC compatible, DOS operating system compatible and that the target system include compatible video display, keyboard, and disk system hardware and software. For many target system applications, the need to provide extra hardware and software for merely debugging purposes renders such an approach economically infeasible.

In many prior art development environments, the application program is down-loaded to and stored on the target system after it is determined through one of the above prior art methods that the application program is functioning at some acceptable level of accuracy or efficiency. When the application program is to be down-loaded, the program instructions are typically generated using prior art methods by a compiler or assembler with relative address references for both code and data. In most prior art systems, the problem of locating the instructions on the target system is resolved through use of a table of values to "fix up" or convert the address references to references required by the target system. Such a "relocation table" is generated in compilers and assemblers in conjunction with the generation of executable instructions. This approach, however, requires that all addresses or locations be resolved to a specific location before the program can be run.

In prior art systems, addresses are, more specifically, resolved in one of two primary ways:

1) by having the target system compute the next available address and perform address resolution before the program is run, or
2) by providing specific memory resolution information for the target system before loading the application into the target system.

The first method is widely used in many popular computing environments such as the IBM PC but has the drawback of requiring that the target system have the relocation table in memory to perform the required address resolution.

The second approach is typically used in relocating an application designed for small operating systems. Under this second method, relocation decisions are made manually at program build time, and the relocation is performed with the presumption that the program my occupy a fixed address in the target system without conflict. This method is adequate for single application environments, but when the method is extended to target systems capable of running multiple applications, difficulties arise. If one or more applications are loaded onto the target system, the relocation must be performed manually before each program load to avoid overwriting the data or code space of the other applications. Therefore, this method is cumbersome, error prone, and inappropriate for loading applications designed to operate on target systems in the field.

SUMMARY OF THE INVENTION

In view of the deficiencies in current embedded systems development and debugging strategies, the current invention provides a method and system whereby a program intended for a target system can be developed and tested directly on the host system. This approach provides a developer using the invention to observe the operation of the program in the target system as the program is being developed. The method and system are particularly useful in developing applications for target systems that incorporate very austere I/O capabilities.

As will be discussed in greater detail below, a host system is connected to the target system in the preferred embodiment via a communications link. A program is loaded onto the host computer that translates operating system calls into a number of communication signals that are transmitted over this communications link. A communication program that is compatible with a communications program residing on the host system is loaded onto the target system. Such a program translates the communication signals into operating system calls in the target system. The operating system calls are interpreted by the operating system and the output hardware of the target system is manipulated in response to the operating system calls.

In a similar way, input from the target input hardware is processed in the preferred embodiment. An input to the target system, such as through the use of a keypad on the target system hardware, causes the operating system on the target system to be informed of an event. The target operating system in turn sends an operating system signal to a debugging application in the target system. The debugging application in the target system then sends an operating system signal to the operating system.

The operating system translates the operating system signal to an event signal for communication over the communications link and sends the event signal over the communications link. The host system receives the event signal from the communications link and processes the event signal using a communication program resident on the host system, thereby translating the event signal into a host system operating system signal. This operating system signal is transferred to the application under development in the host system.

In this manner both input and output events are physically executed or initiated using the target system's hardware while one or more applications under development reside and are executed in the host computer development environment. Such a method and system present the additional advantage that the application developer can use the host system to engage more sophisticated diagnostic tools to aid in the application program development.

As with many prior art development environments, after the correct operation of the program is determined by the present invention, the application program is down-loaded to and stored on the target system. To accomplish this, the invention employs a method not known in the art to address the difficulties created by program instructions generated by a compiler or an assembler associated with relative address references for code and data. The current invention improves upon and eliminates many of the shortcomings found in the prior art by providing a novel method for resolving the addresses in a target application. The instant invention provides a special application loader program that communicates with the operating system of the target device and interrogates the status of the target systems code and data memory. The application loader decides, based on the size of the application to be loaded, where the application may be stored in the target memory space. If insufficient space is available on the target system, then in the preferred embodiment of the instant invention, an error message is displayed and the download process is aborted. Otherwise, the download program proceeds to operate on the application program to resolve its addresses.

In addition to the advantages immediately apparent in the design of the instant invention, further advantages that might not be as apparent also flow from the method and system described in greater detail below. One additional advantage is that the development environment allows the application developer to generate, test and debug an application program that is too large for the specific memory capacity of the embedded system that is, or that comprises a part of, the target system so that the developer is not bound during application development by the physical constraints of the target system's memory. This feature is especially important if the memory limitations of the target system can be addressed by subsequently compacting the developed application code or if the field version of the target system upon which the application is to be implemented will have greater memory capacity that the target system used for testing and development.

Additionally, this feature permits the development of applications that are meant for implementation on an extended operational system that implements I/O without an embedded system or special purpose system or in which an embedded system comprises only a subsystem of the operational system or acts only as a peripheral device, thereby allowing the testing of the input/output features of the overall operational system without necessarily testing the entire operational system.

DETAILED DESCRIPTION OF THE PREFERRED EMBODIMENTS

The preferred embodiment for the current invention is a development system for a mobile terminal marketed under the tradename MPT. The MPT is a hand held wireless terminal product of Research In Motion Limited, of Waterloo, Ontario, Canada that is designed to have hardware and operating system support for a wide variety of application programs. The hardware and operating system support are specialized for, but not limited to, financial transaction environments and may also include a number of other capabilities including two way paging and point-to-point or broadcast messaging.

Figure 1:
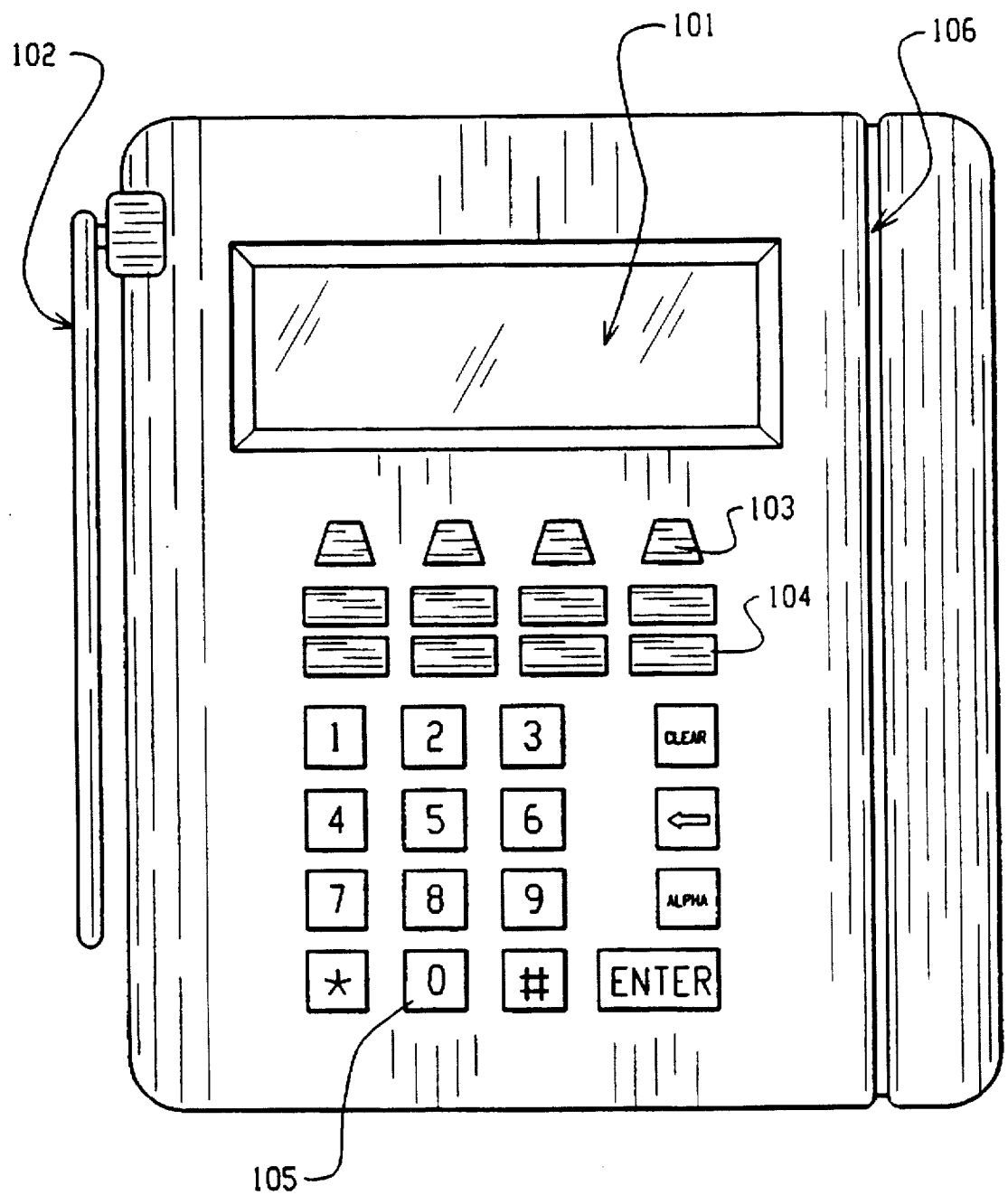
FIG. 1 shows the physical appearance of the preferred embodiment of the target system of the current invention.

FIG. 1 illustrates the MPT, which is one example of a terminal that can be used with the current invention as the hardware platform for the target system. Illustrated in FIG. 1 is MPT's LCD display 101, used for displaying information to the user of the terminal, folding antenna 102 used as the antenna to contact the RF network, soft function keys 103 for application and context specific functions, function keys 104 for additional application functions, alpha-numeric telephone-style keyboard 105 for user data entry, and magnetic card reader slot 106 for reading cards with a magnetic stripe, such as credit cards.

Figure 2:
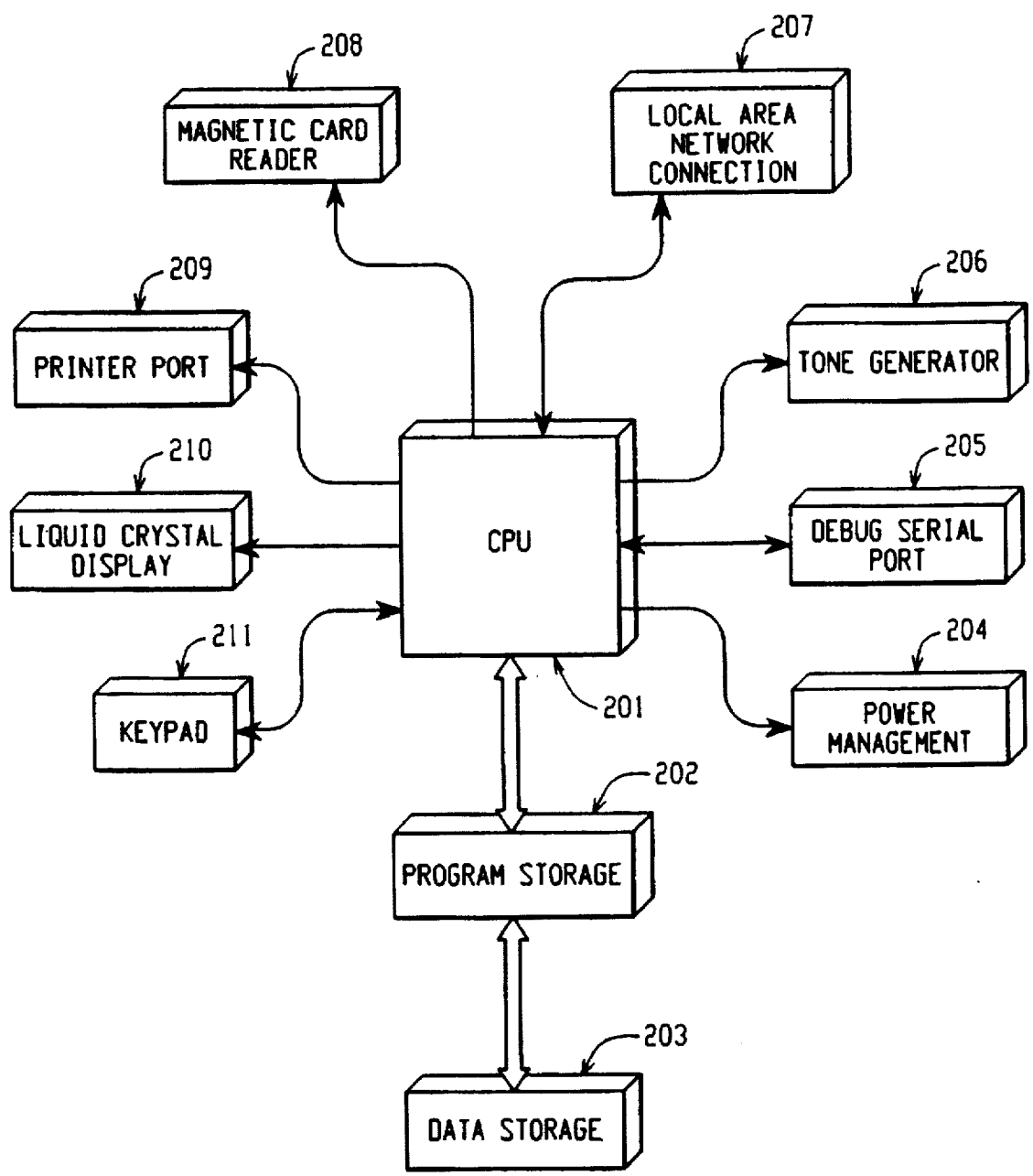
FIG. 2 shows the Operating System Modules and Interconnections for the preferred embodiment of the current invention.

FIG. 2 is the block diagram of the major hardware subsystems of the MPT. As shown in FIG. 2, designated as 201 is a Central Processing Unit ("CPU") that, in conjunction with its operating system software, is capable of executing one or more application programs contained in Program Storage 202, using data stored in Data Storage 203 and performing specific actions on at least one of peripherals 204–211.

Power management 204 is preferably a timer that causes liquid crystal display 210 to be powered-down and CPU 201 to operate at a slower speed. The MPT remains in this power saving state until a key on keypad 211 is pressed.

Debug serial port 205 provides the link to the host system through which the host system sends commands to the debug application on the MPT and through which the debug application sends hardware events to the host system.

Tone generator 206 is a standard piezoelectric device, such as a crystal, whose frequency is controlled by CPU 201.

An external network can be connected through the RS-485 DIN Local Area Network Connection 207.

The information stored on the magnetic stripe of a credit card or other cards with such a magnetic stripe can be read by magnetic card reader 208 and sent to CPU 201 to be processed by the software.

CPU 201 can issue commands to an external printer or similar device via printer port 209 as may be required by a particular application.

Liquid crystal display 210 ("LCD") is the primary device for displaying information to the operator of the MPT. LCD 210 is controlled by CPU 201 through its operating system as may be required by a particular application to prompt the user to enter data, or to inform the user of certain events.

The user of the MPT is able to enter both text and numeric data manually using keypad 211 which generates events that are decoded by the MPT operating system software.

Figure 3:
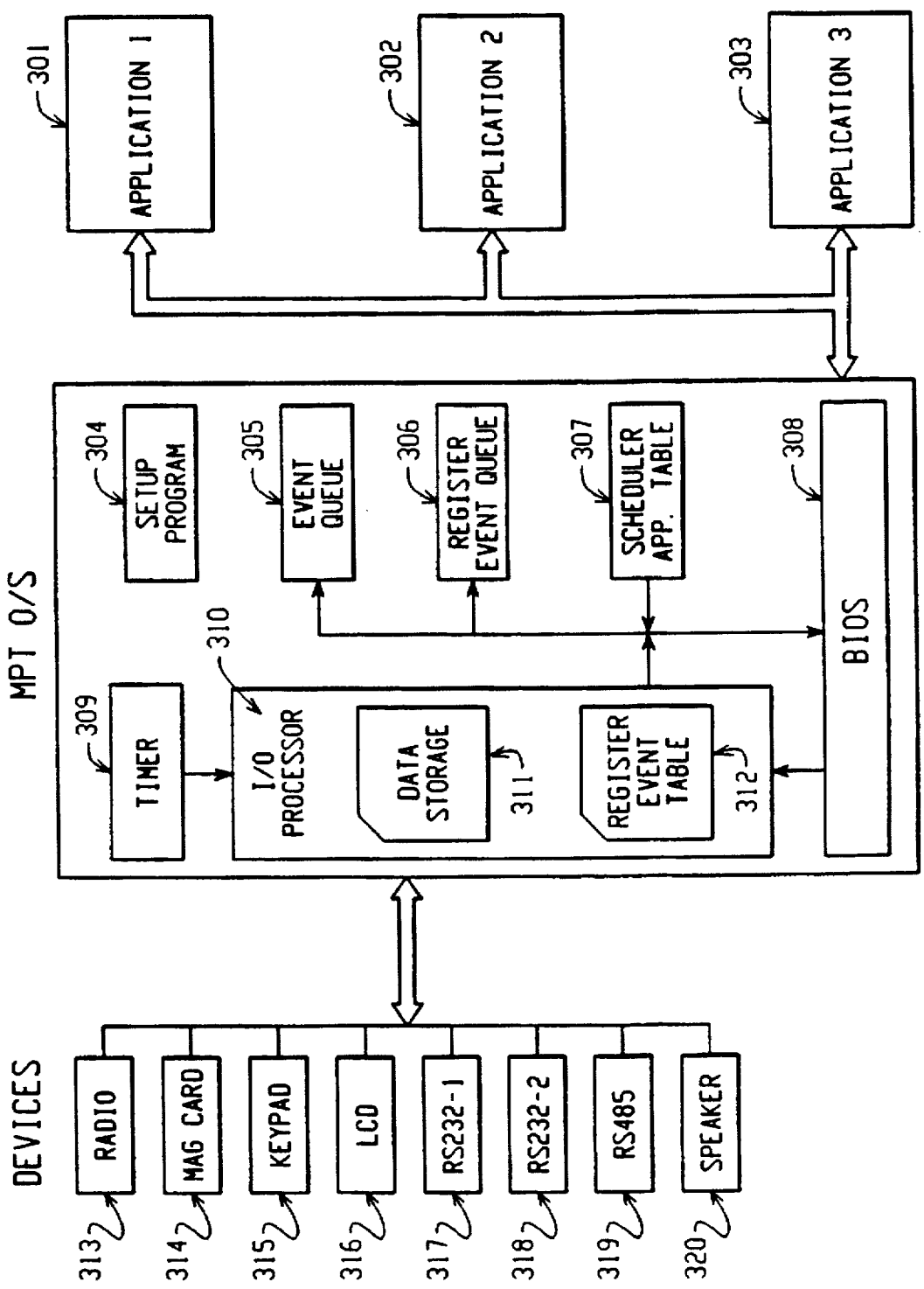
FIG. 3 illustrates the Operating System Modules and Interconnections.

FIG. 3 illustrates the operating system architecture for the preferred embodiment of the invention. This diagram illustrates the principal hardware and software entities and their primary paths of interaction. User applications 301–303 communicate directly with the operating system through the BIOS (Built In Operating System) 308. The BIOS 308 is an interface specification that provides access to operating system services, such as displaying characters on LCD 316, or requesting data from a magnetic card swipe. There are three user applications shown in the FIG. 3, but one may appreciate any number of applications, up to an artificial or physical limit imposed by the operating system or the hardware may be implemented. In the preferred embodiment, all applications are stored in the program storage area. With more powerful multitasking and threading techniques readily available more than one application may be executing in the foreground at any point in time, in the preferred embodiment one application at a time runs in the foreground or is "in focus," i.e., it is the primary application to which I/O is directed. The practice of defining one application as the focused application in a multi-application environment is well known in the industry and is practiced by operating systems such as Microsoft Windows, a product of Microsoft Corporation of Redmond, Washington. In the preferred embodiment, the application that is in focus by default receives input from and delivers output to Devices 313–320. It should be noted that although items 313–320 are labelled Devices, included as items 317–319 are communication ports to which other devices may be, but need not necessarily be connected.

A request for output from an application is generated in the form of a call to the BIOS 308. The BIOS 308 in turn, interprets and translates this output request and calls the appropriate routine in I/O Processor 310. I/O Processor 310 performs the requested output on Devices 313–320.

Input from the user is realized as excitation of one of Devices 313–320 and causes notification of I/O Processor 310. I/O Processor 310 interprets and queues the input as an "event". Events are stored in Event Queue 305. The application that has the current focus is informed sequentially of the device excitation events in the order in which they occurred.

Timer 309 is a device that can be programmed by an operating system call to generate a Timer event after a known fixed time delay. This allows an application program to wait a certain amount of time for an event to happen and proceed if the time-out value is exceeded.

In addition to the regular input and output methods described above, there is a further mechanism to route specific I/O to a specific application. The operating system that comprises the preferred embodiment provides a BIOS function that allows an application to indicate that it requires to be informed of events from a specific device or devices, even when another application is in the foreground. The application events and the devices from which they originate that are "registered" are stored in Register Event Table 312. Events from the registered devices are first checked for inclusion in Register Event Table. If they are not registered by a specific application, the events are passed on to the application that has the current focus. In the preferred embodiment, registered events are stored in a separate event queue, Register Event Queue 306.

Scheduler and Application Table 307 is the process controller in the preferred embodiment of the operating system that comprises the invention. The Scheduler part of item 307 in turn manages each of the queue functions in the MPT O/S. Part of managing Event Queue 305 and Register Event Queue 306 involves sending messages to the appropriate application or applications.

Additionally, the preferred operating system includes Setup Program 304 that performs general user-initiated terminal management functions. Setup Program 304 permits the operator of the terminal to perform such functions as selecting which application should be the foreground application, suspending the operation of selected applications, or re-initializing applications to their starting conditions.

Figure 4:
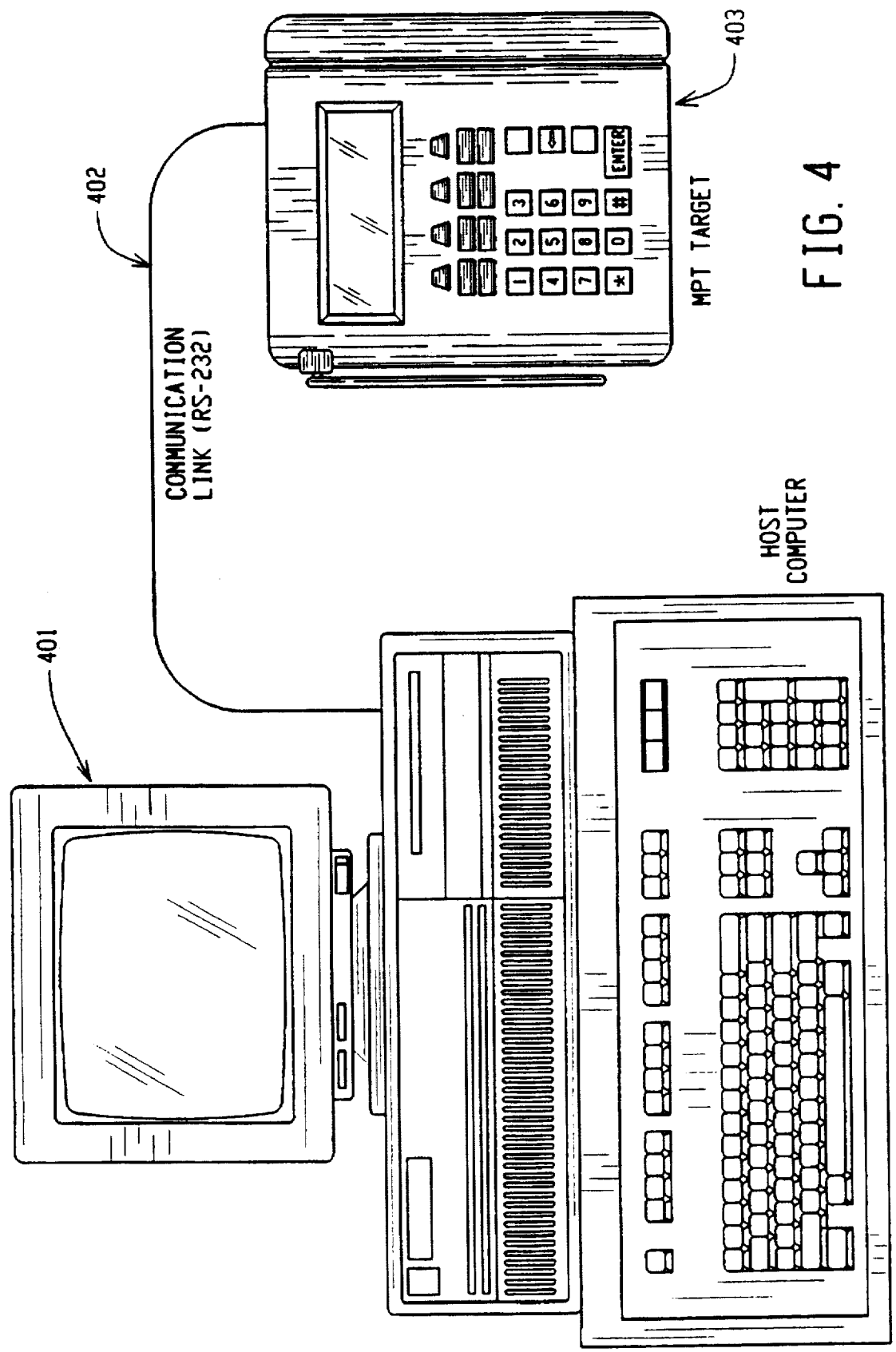
FIG. 4 illustrates the connection of Host System 401 to Target System 403 for purposes, in the preferred embodiment, of loading an application or for verifying the correct operation of such application.

FIG. 4 illustrates the physical Debugging Interconnections between Host Computer (Host System) 401 and MPT Target (Target System) 403. The interconnection method used in the preferred embodiment is a bi-directional RS-232 serial connection. This type of connection is well known in the industry as a standard method of connecting data communicating devices together, although one of ordinary skill will appreciate that other types of communication connections will suffice as well. The interconnection cable 402 is a standard "null modem" connection. The specific construction of such a cable is well-known to those skilled in the art of computer communications. The nature of this specific communications channel is that signals comprising information may be transmitted in either direction over the link. The instant communications link allows for the simultaneous transfer of asynchronous bitwise information, although it should be appreciated that any communications channel, cable, system or network capable of transmitting information in two directions could be substituted for Communications Link 402.

Figure 5:
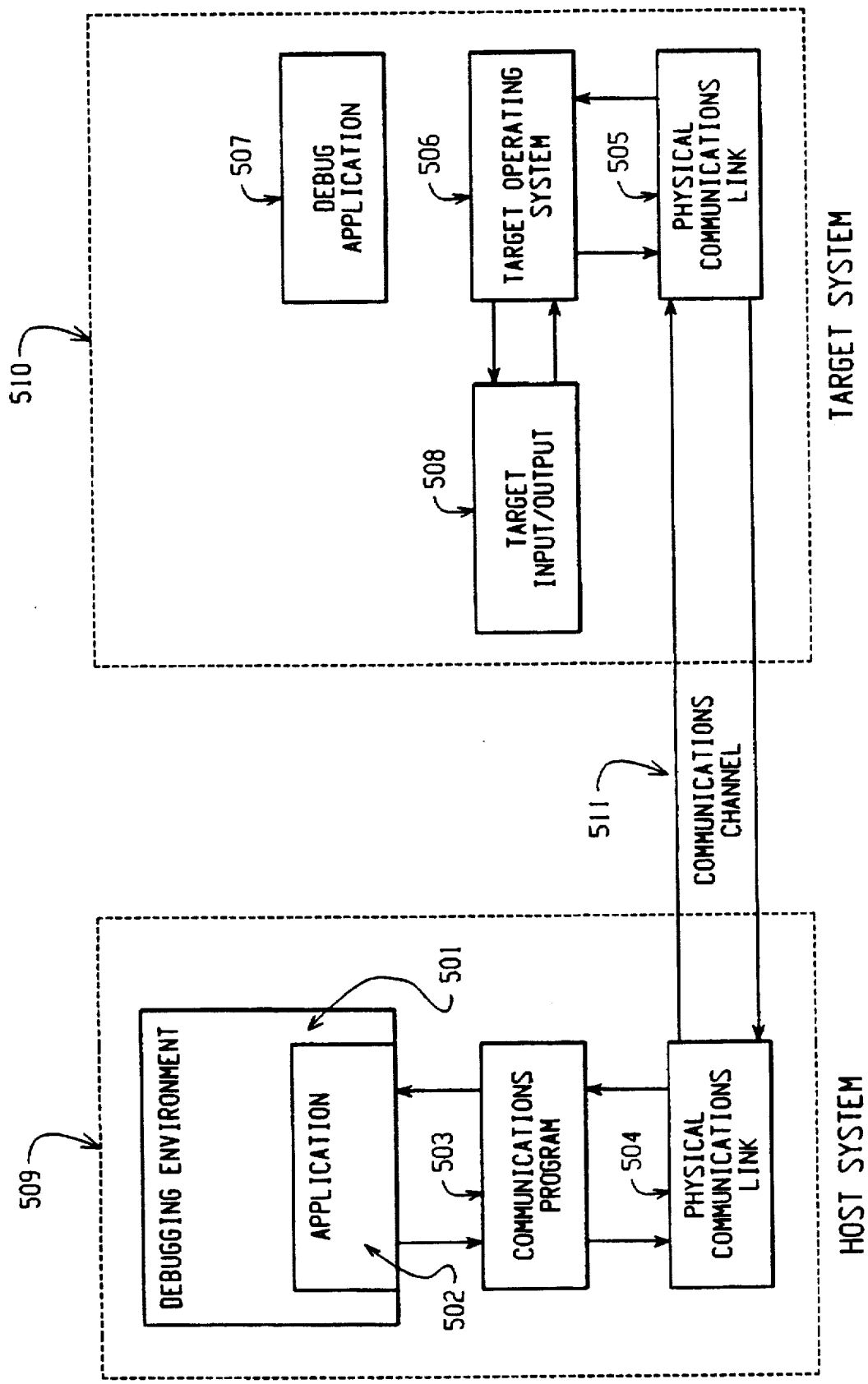
FIG. 5 shows the Logical Debugging Interconnections, or the logic and control flow between the modular elements in the preferred embodiment.

FIG. 5 illustrates Logical Debugging Interconnections between the Host System 401 and Target System 403 or the connection and communication paths between the various software and hardware entities in the entire system. Application Program 502 under nest in the Debugging Environment 501 operates in Host System 509. A well-known method of debugging applications for the IBM PC as a target system is to run the Application Program under test inside a Debugging Environment 501 such as CodeView, a product of Microsoft Corporation of Redmond, Washington or Borland Turbo Debugger, a product of Borland International Inc. of Scotts Valley, Calif. These debugging environments permit a developer to inspect the application program, control its execution, halt execution of the program and examine the contents of program data storage areas. These tools have been available for several years and have matured to the point where they are both inexpensive and support many powerful debugging features. It should be noted that while the debugging environment provides an excellent and inexpensive mechanism for controlling and observing the application under development, there is no requirement that an application under test run under such a debugging environment. It is possible, and often desirable, to run an application under test directly from the operating system of the host system. When Application 502 is running in this manner, operating system calls for Target System 510 will be directed to such system through the INT call. All other operating system calls, in the preferred embodiment, will be directed towards Host System 509. It should be appreciated by one of ordinary skill in the art, however, that all the operating system calls not associated with a target system do not necessarily have to be directed to a host system, but could be advantageously directed to a number of other systems using the INT call or a similar function. The method and system of the preferred embodiment, however, permits the display and keyboard of Host System 509 to be used under Application Program control, in concert with the I/O of Target System 510, to control the operation of and annunciate the operating status of the Application Program that is being debugged or tested.

The Application Program under test is run in the preferred embodiment under the supervision of the Debugging Environment. When the Application Program needs to send output to Target System 510, a normal operating system level call is made. In Host System 509, a special Communications Program 503 is preloaded, in the instant case, as a TSR (Terminate and Stay Resident) program that accepts these operating system calls. In the preferred embodiment, the mechanism by which operating system calls are made is via the Intel x86 software INT mechanism, defined by Intel Corporation of Santa Clara, Calif. and well known in the software development community. The operating system calls from Application 502 are identical, whether the application is running on Host System 509 or is running on Target System 510. That is, both Target Operating System 506 and Communications Program 503 accept the same operating system calls through the same mechanism. The fact that both Target System 510 and Host System 509 microprocessors have identical software INT capabilities simplifies the design of Communications Program 503. As one of ordinary skill in the art of digital communications software will appreciate, if the operating system call mechanisms differed between Host System 509 and Target System 510, a simple additional translation in Communications Program 503 and/or Debug Application 507 would accommodate this difference.

Communications Program 503 generates signals from the above-mentioned operating system calls and relays these signals over Physical Communications Link 504. As stated above, the physical communications link is a bi-directional RS-232 serial communications link. The signals cross Communications Channel 511 and arrive at Physical Communications Link 505 in Target System 510. Target Operating System 506 receives these signals and relays the receipt of the messages contained in the signals to Debug Application 507. Debug Application 507 then interprets the messages and translates them into an operating system call equivalent to the operating system call that was originally made by Application 502. This operating system call then causes Target Input/Output 508 to be exercised accordingly. An example of a typical operating system call that operates in this manner in preferred implementation of the system and method in the MPT is the __LCDputch call. The __LCDputch call displays a given character on the LCD display of the MPT.

Similarly, for each excitation event generated physically on Target Input/Output 508, such as a keyboard keystroke or a magnetic card swipe, Target Input/Output 508 sends a signal to Target Operating System 506. This signal is then translated by Target Operating System 506 into an operating system signal. AS in normal operation, the application with the current focus (in this case the Debug Application 507) is sent an operating system message with the appropriate information. The Debug Application 507 translates the operating system message into a signal for transmission over Physical Communications Link 505. The signal is then transferred over Communications Channel 511 to Physical Communications Link on Host System 509. Communications Program 503 then interprets the signal, and performs a corresponding translation from communications signal to operating system signal. That operating system signal is then sent to the Application 502 as a message. An example of a typical operating system call that operates in this manner in the preferred operating environment of the MPT is the KEYPAD message ENTER__KEY, which register the excitation of the enter key on the MPT key pad.

Figure 6:
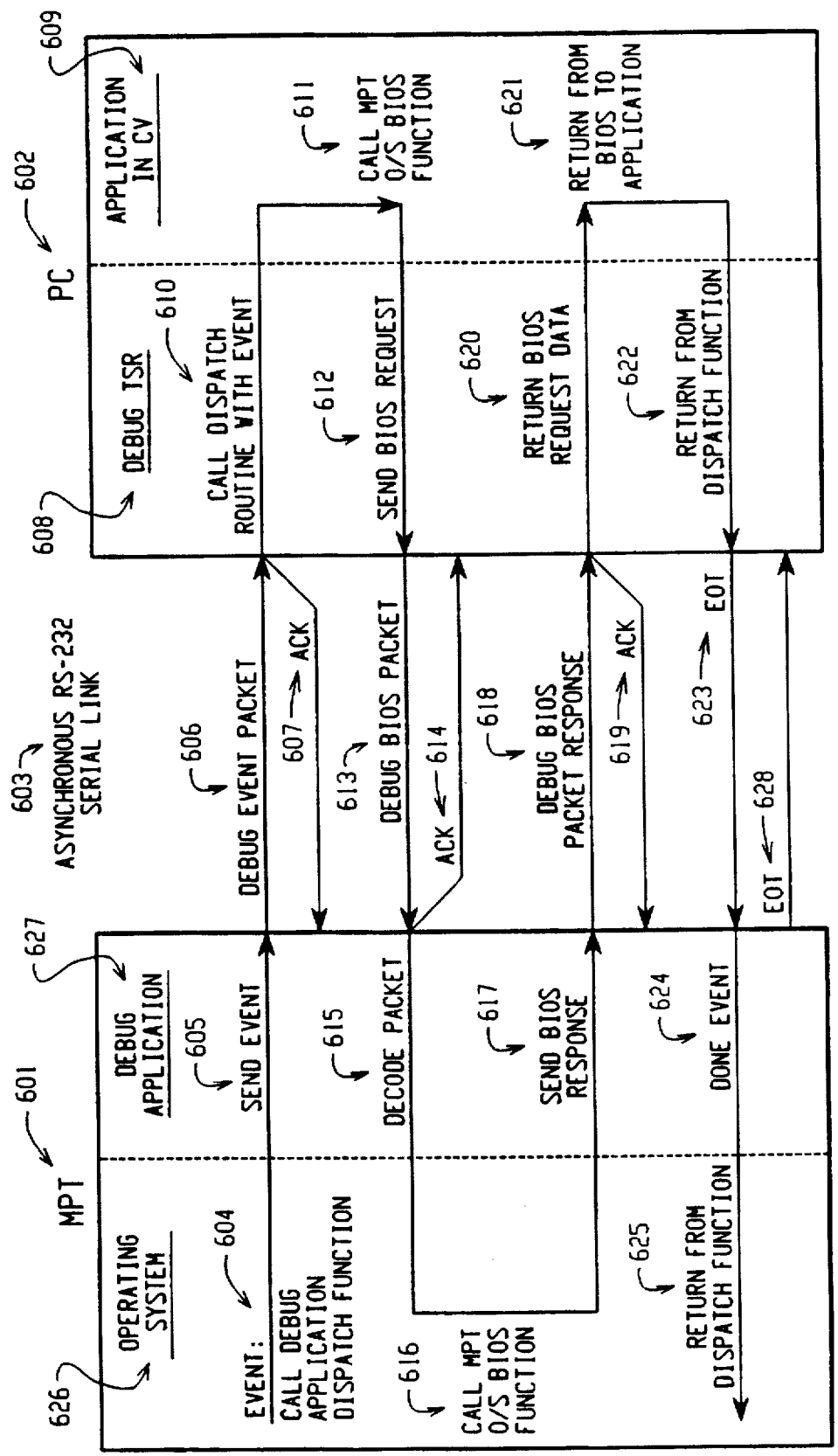
FIG. 6 illustrates a typical, detailed sequence of events between the Target System and the Host System.

FIG. 6 illustrates a typical detailed sequence of events than occur when the current invention is operating and/or debugging an application program. The event sequence illustrated involves a hardware event on the MPT initiating a response in the application program, which causes a corresponding output to a hardware device on the MPT. A typical example of such a sequence occurs when a pressed key on the keyboard of the MPT (such as the "2" Key) would cause a "2" to appear in the next cursor position on the LCD display (101 or 210) of the MPT. This sequence would occur in many applications, for example in a point of sale application during entry of a transaction amount.

Target System MPT 601 is connected to Host System PC 602 via Asynchronous RS-232 Serial Link 603 in the same manner as described above. A hardware event causes Operating System 626 to send a message (Call Debug Application Function 604) to Debug Application 627 to execute a dispatch function. Debug Application 627 in turn translates this message into a debug event packet format and sends Debug Event Packet 606 via RS-232 Serial Link 603. In the preferred embodiment, Debug Event Packet 606 contains information concerning the type of event and may contain extra data, such as information obtained through the reading of a magnetic stripe in the case of a magnetic card read event. Debug TSR 608 on PC 602 receives Debug Event Packet 606, and if the packet is received without communication error a single byte ACK 607 is returned. ACK 607 is the indication to the MPT Debug Application that the Send Event 605 message has completed, allowing Debug Application 627 to continue its execution.

The receipt of Debug Event Packet 606 by Debug TSR 608 causes Dispatch Routine With Event 610 to be called. The information in Debug Event Packet 606 is transformed into the same message format as is used to communicate messages between MPT Operating System 626 and applications. Application 609, which receives the indication of this event in the preferred embodiment is in CV (CodeView). As stated earlier, Application 609 is written to respond to the receipt of this event by requesting an output on the MPT, in this case a character on the LCD screen.

To initiate this output, Application 609 calls MPT O/S BIOS function 611. This BIOS function call is received by Debug TSR 608, which interprets the BIOS call, initiates Send Bios Request 612 and formats and sends corresponding Debug BIOS Packet 613. BIOS Packet 613 is sent over Asynchronous RS-232 Serial Link 603. In a manner similar to the ACK process from Debug TSR 608, Debug Application 627 sends ACK packet 614 to Debug TSR 608 to indicate successful reception of Debug BIOS Packet 613.

Upon receiving Debug BIOS Packet 613, Debug Application 627 decodes (at 615) Debug BIOS Packet 613 and calls a corresponding MPT O/S BIOS function in the MPT (at 616). MPT Operating System 626, at this point, actually performs the requested function and returns the status of that operation as Send BIOS Response 617. Send BIOS Response 617 is translated into Debug BIOS Packet Response 618 and transmitted over Asynchronous RS-232 Serial Link 603. Debug TSR 608 accepts Debug BIOS Packet Response 618, and indicates correct reception of this packet with a single byte ACK packet 619. Debug TSR 608 then translates Debug BIOS Packet Response 617 into a response to the original BIOS Request initiated by Application 609. Debug BIOS Packet Response 618 may be simply a BIOS function completion code or it may contain additional information.

At this point, Application 609 has completed the processing of the original system event. If Application 609 were running inside the MPT, this causes a return of processor control to the Target (MPT) Operating System 626. This return of control allows the processing of additional events. The return of control by Application 609 is indicated to Debug TSR 608 as a Return From Dispatch Function return 622 and translated into a single character (EOT) message 623 by Debug TSR 608. The EOT message is sent over Asynchronous RS-232 Serial Link 603 and interpreted as a Done Event message 624 by Debug Application 627. Debug Application 627 in turn returns control to MPT Operating System 626 via Return from Dispatch Function 625. To maintain synchronization in the data flow between MPT 601 and PC 608, an additional EOT 628 is provided from PC 602 back to MPT 601 in the preferred embodiment.

Figure 7:
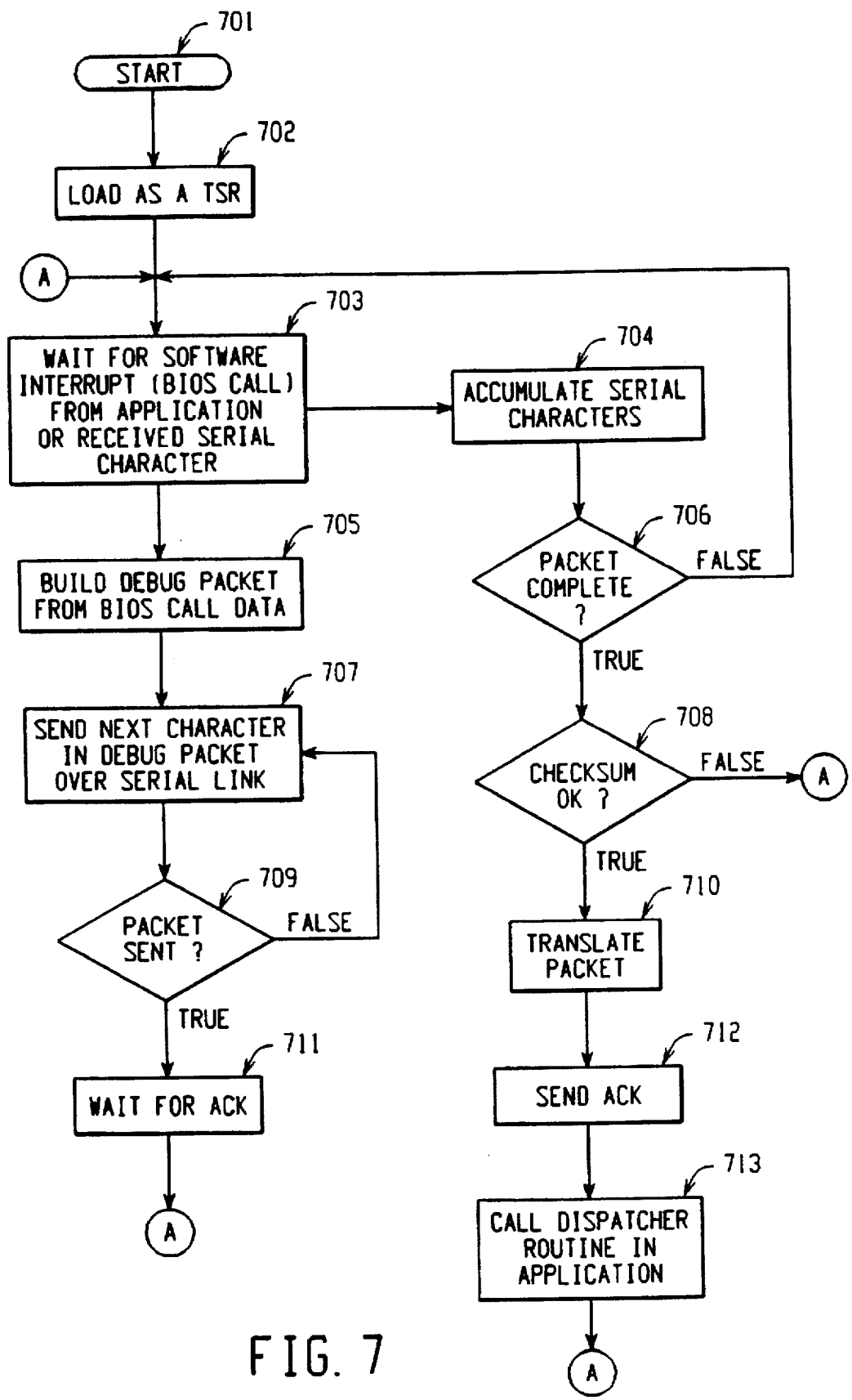
FIG. 7 illustrates the decision flow in the Host System Debugging TSR.

FIG. 7 illustrates the Host System process flow. This is the sequence of program steps that define the operation of the Debug TSR 608 shown in FIG. 6. The Debug TSR program begins at the Start 701 step, where it is initialized and begins program execution. The Debug TSR then loads itself as a TSR at step 702, and returns control of the host system to the operating system. The loading of an application program as a TSR is a well-known practice in PC-based software development. Loading an application as a TSR frees the host operating system to run the Debugging Environment and Application shown on FIG. 5 as items 501 and 502, respectively. The Debug TSR then enters state 703, where it waits for either a BIOS function call from Application 501 or a serial character input from the communications link. On receipt of a serial character, the Debug TSR enters the Accumulate Serial Characters State 704. The accumulated serial characters are then examined at step 706. If the accumulated serial characters do not constitute a full debug packet, the Debug TSR returns to state 703. If the accumulated serial characters do constitute a full debug packet, then the packet is examined for a correct Cyclic Redundancy Check (CRC) check sum at step 708. The use of a CRC is a common method of verifying the correct reception of a complete packet of information. It would be well known to one of ordinary skill in the area of error correction and control to extend the instant invention to incorporate more intricate system checksums, delimiting characters, or any combination of additional verification means. If the packet does not pass the verification test at step 708, the Debug TSR returns to state 703 (label A). If the debug packet passes the checksum test, the packet is translated into an appropriate BIOS event message at step 710, and an ACK is sent across the serial link to the Debug Application on the Target System at step 712. The Debug TSR then makes a call to the dispatcher function in the Application in the Host System at step 713. Alternatively, if while in state 703, the Debug TSR receives a BIOS call from the Application, the Debug TSR then proceeds at step 805 to build the Debug Packet from the data supplied with the BIOS call. In the preferred embodiment, this information is supplied through register contents, although it can be supplied through any direct or indirect data storage. The Debug Packet thus formed is transferred character by character through the Serial Link at step 707. After each character is sent, a test is performed at step 709 to determine if this is the final element of the packet. If the last character sent is not the last character in the packet, then the Debug TSR returns to state 707. If the last character sent is the last character in the packet, then the entire packet has been sent and the Debug TSR enters state 711. At step 711 the Debug TSR waits for an ACK from the Target System side of the communications channel. When this ACK is successfully received, the application returns to step 703 to wait for the next event. An alternative to the simple protocol implemented in the preferred embodiment includes a mechanism or process for resending Debug Packets or control signals such as ACKs if the items to be received are not successfully received within a time-out period.

Figure 8:
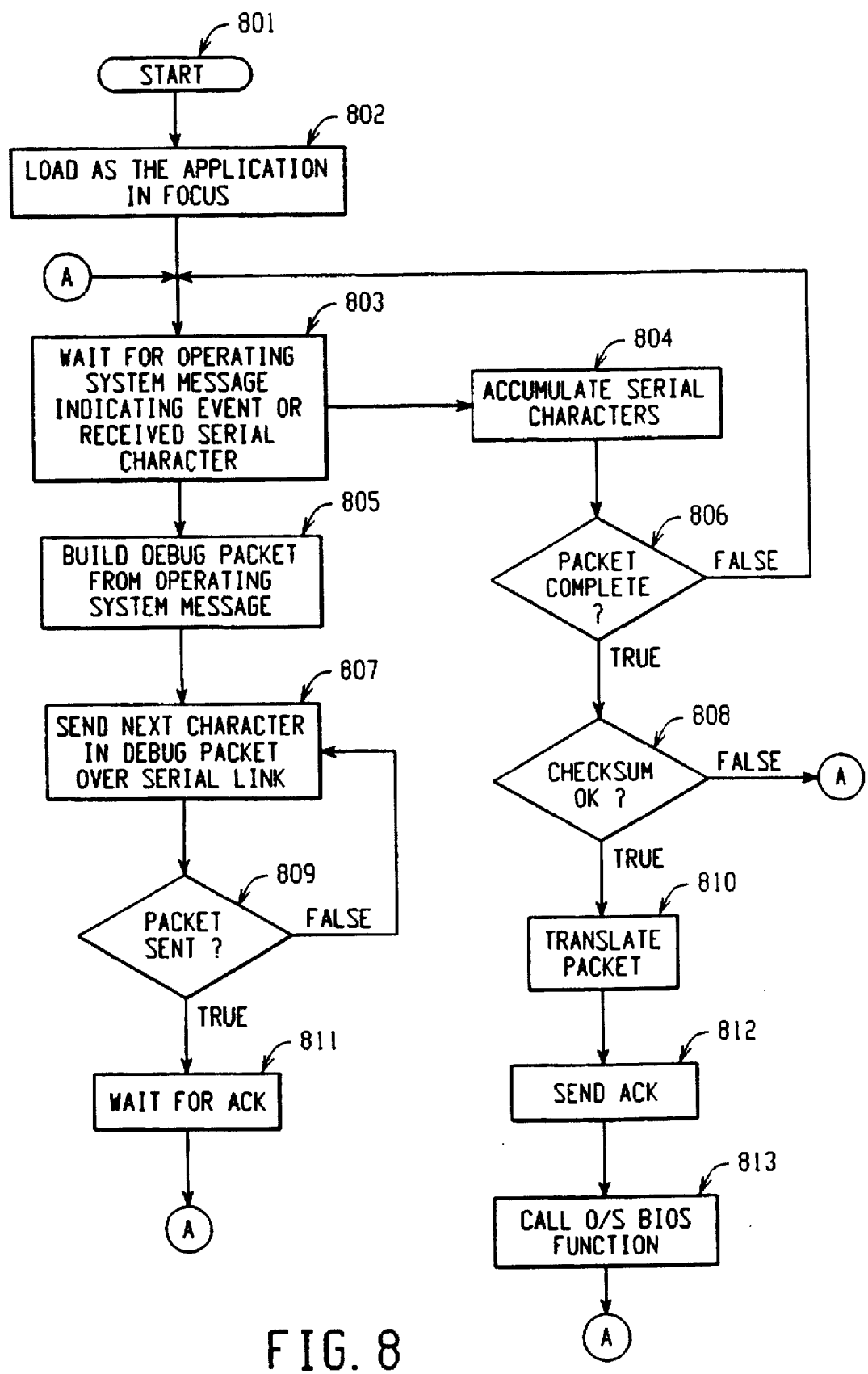
FIG. 8 illustrates the decision flow in the Target System Debugging Application.

FIG. 8 illustrates Target System process flow. This is the sequence of program steps that define the operation of Debug Application 627 shown in FIG. 6. The Debug Application program begins at the Start 801 step, where it is initialized and begins program execution. The Debug Application then loads itself as an Operating System Application at step 802 and returns control to the Target Operating System 506. The Debug Application then enters state 803, where it waits for either an event from the Target Operating System 506 or a serial character input from the communications link. On receipt of a serial character, the Debug Application enters the Accumulate Serial Characters state at step 804. The accumulated serial characters are then examined at step 806. If the accumulated serial characters do not constitute a full debug packet, the Debug Application returns to state 803. If the accumulated serial characters do constitute a full debug packet, then the packet is examined for a correct Cyclic Redundancy Check (CRC) check sum at step 808. As discussed above, the use of a CRC is a common method of verifying the correct reception of a complete packet of information, and the simple error correction and control that the CRC provides in the preferred embodiment could, with little additional effort, be extended to incorporate a more extensive correction scheme.

If the packet does not pass the verification test at step 808, the Debug Application returns to state 803 (label A). If the debug packet passes the checksum test, the packet is translated into an appropriate BIOS function call at step 810, and an ACK is sent across the serial link to the Host System Debug Application at step 812. The Debug Application then makes a call to the BIOS in the Host System at 813. Alternatively, if while in state 803, the Debug Application receives an event message from the Host System Operating System, the Debug Application then proceeds at step 805 to build the Debug Packet from the data supplied with the event message. In the preferred embodiment, this information is supplied through register contents, although can be supplied through any direct or indirect data storage. The Debug Packet formed at step 805 is transferred character by character through the Serial Link at step 807. After each character is sent, a test is performed at step 809 to determine if this is the final element of the packet. If the last character sent is not the last character in the packet, then the Debug Application returns to state 807. If the last character sent was the last character in the packet, the Debug Application enters state 811. In state 811 the Debug Application waits for an ACK from the Host System side of the communications channel. When this ACK is successfully received, the application returns to state 803 to wait for the next event. As above, an alternative to the simple protocol implemented in the preferred embodiment in the Target System Debugging Application Process includes a mechanism or process for resending Debug Packets or control signals such as ACKs if the items to be received are not successfully received within a time-out period.

Figure 9:
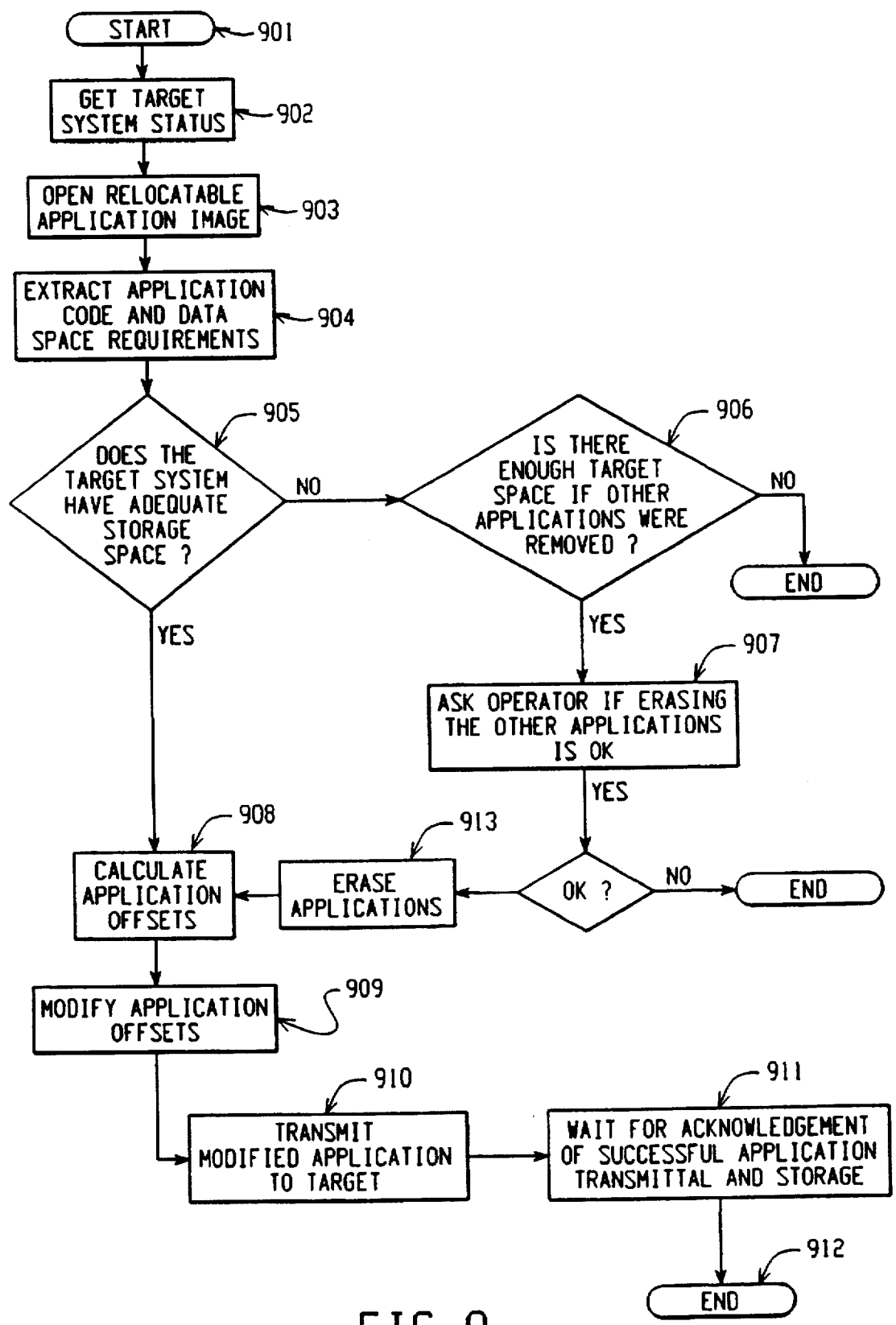
FIG. 9 illustrates the process flow loading an Application into the Target System.

FIG. 9 illustrates the Application Loading Process Flow. This is the sequence of events that occur when an application is to be stored in the application memory space in Target System. The result of the debugging or verification process is a relocatable program image. Relocatable programs have all of the internal address references unresolved, or relative to the location or locations that the application will ultimately be run from. The current embodiment uses the DOS "EXE" format as output from the standard DOS application development tools such as Microsoft C/C++, a product of Microsoft Corporation of Redmond, Washington or Borland C++, a product of Borland International Inc., of Scotts Valley, Calif.

In the preferred process, the Application Loader first interrogates the Target Operating System for the target system status via the Serial Link at step 902. The system status returned includes, but is not limited to, a) the starting address of free code storage, b) the starting address of free data storage, c) the quantity of remaining code storage, d) the quantity of remaining data storage, e) the size of total system code storage available if no other applications were in the system, and f) the size of total system data storage available if no other applications were in the system. At the next step 903, the Application Loader opens the file that contains the Application that is to be loaded onto the Target System. This file is analyzed and the code and data space requirements are computed. The results of this computation are compared to the reported Target System storage space availability at step 905. If the Target System does not have sufficient space to store the application, a further comparison is made at step 906 to determine if the application would fit if the other applications in Target System were removed. If there would not be sufficient space, the loading of this Application can not proceed, and the Application Loader is terminated with an appropriate warning message.

if the Target system would have sufficient storage space with the other applications removed, the operator of the Application Loader program is given the option to erase the other applications in Target System memory space at step 907. If the operator elects to not proceed, then the application terminates with appropriate annunciation. If either there is sufficient application space, or the operator elects to make sufficient application space by erasing other applications through Erase Applications step 907, the Application Loader calculates the pointer or memory reference offsets that would be required for the Application Program at the memory location offsets reported in step 902. The Application Loader then modifies the Application Offsets for the Application program at step 909, and transmits the Application to Target System at step 910. When the Target System acknowledges the successful reception and storage of the Application Program, the Application Loader terminates with a successful completion message.

What is claimed is:

1. A method of downloading and embedding a trial application program from a host system into a target system via a communication channel linking the two systems, wherein the trial application program contains unresolved address references that are not associated with specific memory locations of the target system, said method comprising the steps of:

(a) the host system interrogating the target system's program and data memory via the communication channel in order to determine the specific memory locations of the target system's memory space where the trial application may be embedded;

(b) based on the interrogation step, the host system further resolving the address references of the trial application program into memory specific address references associated with the target system's memory space; and (c) downloading the trial application program that includes the resolved address references from the host system to the target system via the communication channel, thereby embedding the trial application into specific memory locations of the target system's memory space.

2. A method of loading a relocatable program having unresolved address references from a host system to a target system, comprising the steps of:

(a) establishing a communication link between the host and target systems;

(b) determining the storage requirements of the program to be loaded into the target system;

(c) interrogating the target system to determine the available memory capacity of the target;

(d) if the available memory capacity of the target system is greater than or equal to the storage requirements of the program, then:

(d)(1) calculating memory specific address references for the program based on the interrogation step;

(d)(2) modifying the program by converting the unresolved address references to memory specific address references; and (d)(3) loading the modified application from the host system to the target system via the communication link.

3. The method according to claim 2, further comprising the steps of:

(e) if the available memory capacity of the target system is less than the storage requirements of the program, then:

(e)(1) determining whether there would be sufficient memory capacity in the target system if other programs already loaded into the target system are removed;

(e)(2) if there would not be sufficient memory capacity after programs are removed, then generating a warning message; and (e)(3) if there would be sufficient memory capacity then selecting a program already loaded into the target system for deletion, deleting the selected program from the target system's memory, and returning to step (d).

4. A system for downloading and storing a relocatable program having unresolved address references from a host system to a target system via a communication link, comprising:

means for interrogating the target system in order to determine the available memory capacity of the target;

means for determining whether the program can be stored in the available memory capacity of the target;

means for converting the unresolved address references of the program into memory specific address references based upon the memory capacity of the target; and means for downloading and storing the converted program to the memory of the target via the communication link.

5. A system for loading a relocatable program having unresolved address references comprising:

a host system;

a target system;

a communications link connecting the host and target systems; and an application loader program executing on the host system that communicates with the target system via the communication link, determines the status of the target system's memory, converts the unresolved address references of the relocatable program into resolved address references based upon the status of the target system's memory, and loads the resolved program into the target system.

\* \* \* \* \*